No. 884,529. PATENTED APR. 14, 1908.
G. A. SEIB & I. A. WESTON.
DRILLING MACHINE.
APPLICATION FILED NOV. 17, 1905.
2 SHEETS—SHEET 2.
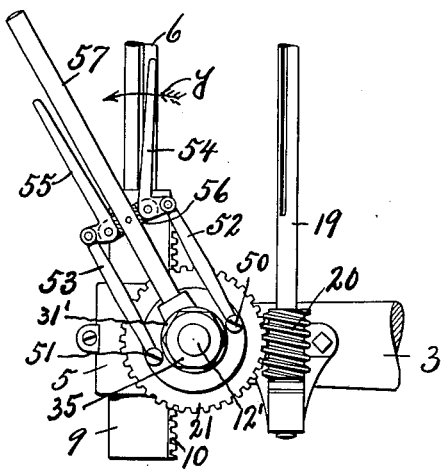
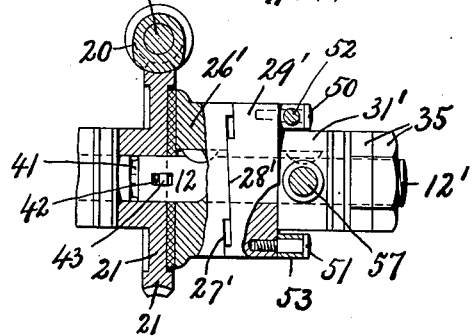
WITNESSES:
B. E. Robinson.
H. E. O'Hare
INVENTORS
George A. Seib and
Irving A. Weston
BY:
Howard P. Denison
ATTORNEY.

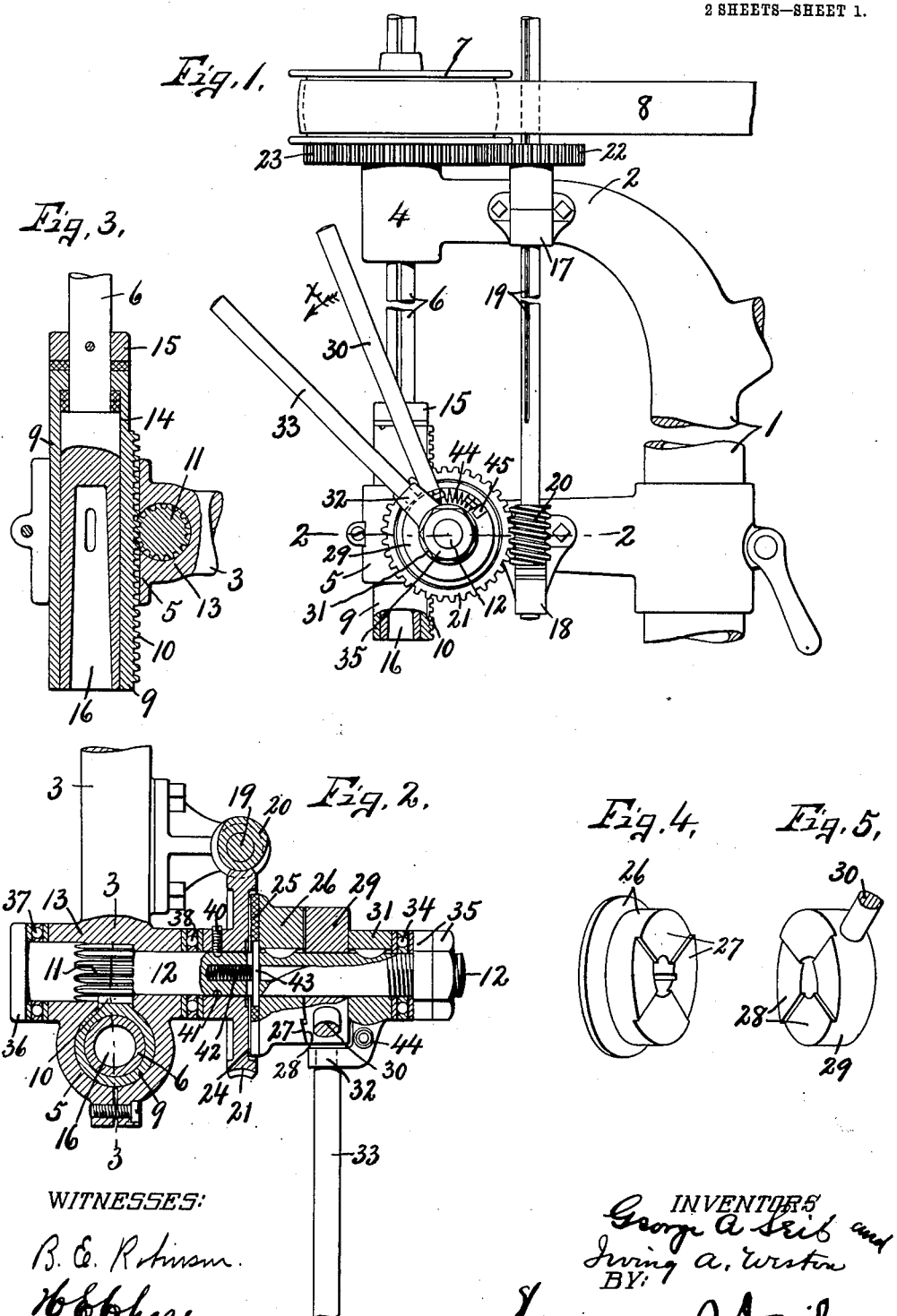

UNITED STATES PATENT OFFICE.

GEORGE A. SEIB AND IRVING A. WESTON, OF SYRACUSE, NEW YORK.

DRILLING-MACHINE.

No. 884,529.

Specification of Letters Patent.

Patented April 14, 1908.

Application filed November 17, 1905. Serial No. 287,883.

*To all whom it may concern:*

Be it known that we, GEORGE A. SEIB and IRVING A. WESTON, of Syracuse, in the county of Onondaga, in the State of New York, have invented new and useful Improvements in Drilling-Machines, of which the following, taken in connection with the accompanying drawings, is a full, clear, and exact description.

This invention relates to improvements in drilling machines in which any rotary driving spindle or shaft carrying a suitable drill holding chuck is movable axially to force the drill into and out of the work or toward and away from an underlying work supporting bed or plate. In drilling machines of this character it is customary to drive the shaft or spindle positively and to feed it axially either by hand or automatically.

When fed by hand the work is particularly laborious especially in drilling tempered or hard metal, by reason of the necessity for the continuous hand pressure upon the feeding lever, the position of which is continuously changing as the drill progresses through the work. On the other hand when the axial feed is purely automatic and positive there is always more or less liability of breaking or unduly heating the drills owing partially to the different degrees of hardness of the metal through which the drill may be passing, or to the different sizes of drills which may be alternately employed.

The essential object of our present invention is to gage the axial feed of the drill into the work according to the quality of the material which is being operated upon. In other words, we have sought to produce what may be termed a semi-automatic feed, that is, one in which the feed is partially manual and partially automatic and involving the use of the slip-feed or friction clutch controlled by a handle which operates by its own gravity to throw the slip feed into action.

Our purpose is to manufacture this semi-automatic feeding device separately so that it may be readily applied to any of the ordinary drilling machines now on the market without necessitating any material alterations, although it will be apparent from the following description that it may be constructed as a unitary part of the machine and used in other analogous devices, such as, wood boring machines, and in fact in any axially movable rotary cutting element.

Other objects and uses relating to the specific construction of the semi-automatic feed will be brought out in the following description.

In the drawings,—Figure 1 is a side elevation of a portion of a drilling machine showing our improved feeding device as applied thereto. Figs. 2 and 3 are horizontal sectional views taken respectively on line 2—2— of Fig. 1, and —3—3— of Fig. 2. Figs. 4 and 5 are perspective views respectively of one of the friction driving members and its manually operated actuating cam. Fig. 6 is a side elevation of a modified form of the semi-automatic feed similar to that shown in Fig. 1. Fig. 7 is a top plan partly in section of a portion of the device seen in Fig. 6.

In order to clearly demonstrate the practicability of our invention we have shown a portion of the upright supporting standard or frame —1— of an ordinary drilling machine having laterally extending arms —2— and —3— having suitable bearings —4— and —5— for supporting a vertical rotary shaft or spindle —6—, upon which is feathered a pulley —7—, the latter being connected by a belt —8— to any available source of power, not necessary to herein illustrate or describe.

The lower end of the rotary spindle or shaft —6— is journaled in a non-rotatable sleeve —9— which is movable axially or vertically with the shaft —6— in the bearing —5— and is provided on its rear face with a toothed-rack —10— meshing with the rotary pinion —11— which is formed upon or secured to a horizontal rotary shaft —12—, Fig. 2, the latter shaft being journaled in a suitable bearing —13— in the arm —3— just at the rear of the vertical shaft —6—. This lower end of the shaft —6— within the sleeve —9— is enlarged forming an annular shoulder —14— and the upper end of the sleeve —9— is interposed between this shoulder —14— and a suitable collar —15— which is keyed to the shaft —6— for the purpose of locking the shaft —6— and sleeve —9— against independent axial movement and at the same time permitting the shaft —6— to rotate within the sleeve —9—, the enlarged portion of said shaft —6— being provided with a tapering socket —16— for receiving any suitable drill chuck, not shown, as these drill chucks are well known and it is believed to be unnecessary to enter into any detailed description of the same.

Secured to the arms —2— and —3— in vertical alinement are bearings —17— and

—18— in which is journaled an auxiliary rotary shaft or spindle —19— having rigid thereon near its lower end a worm —20— meshing with a worm gear —21— which is loosely mounted upon the horizontal shaft —12— and upon the upper end of the spindle —19— is feathered a spur-gear —22— meshing with a similar spur gear —23— which is feathered upon the vertical shaft —6— whereby rotary motion is transmitted from the shaft —6— to the auxiliary shaft or spindle —19— and worm —20—.

When the machine is in operation the drill shafts —6— and —19— and worm —20— rotate continuously and therefore transmit similar rotary motion to the loose worm gear —21—. This worm gear —21— is provided with a friction face —24— adapted to be engaged by a similar friction face —25— of a sliding clutch element —26— which is feathered upon the shaft —12— to transmit rotary motion to said shaft when the clutch member —26— is moved axially, in a manner hereinafter described, into frictional engagement with the continuously rotating worm gear —21—.

The outer end of the clutch element —26— is provided with one or more inclined faces or cams —27— adapted to be engaged by similar inclined faces or cams —28— of a manually operated rocking element —29— which is loose on the shaft —12— and is provided with a suitable hand piece —30— for rocking the same upon the shaft —12—.

A collar —31— is keyed to the shaft —12— at the outer end of the rocking member —29— and is provided with a laterally projecting arm —32— over-hanging the periphery of the rocking member —29— for receiving and supporting a handle —33— in substantially the same transverse plane as the handle —30—, so that both handles may be grasped in the hand simultaneously, if necessary. This collar —31— is interposed between the adjacent end of the rocking member —29— and a suitable end thrust bearing —34— which encircles the shaft —12— and is held in operative position by lock-nuts —35— engaging the adjacent threaded end of the said shaft —12—. The opposite end of this horizontal shaft upon which the pinion —11— is secured is provided with an enlargement or head —36—, between which and the adjacent end of the bearing —13— is interposed an end-thrust bearing —37—, a similar end-thrust bearing —38— being interposed between the opposite end of the bearing —13— and adjacent face of the worm gear —21— to prevent endwise movement of the said worm gear. It is now obvious that the gear —21—, clutch element —26—, rocking member —29— and collar —31— are arranged in the order named end to end between the end-thrust bearings —34— and —38—, the worm gear —21— being further held against axial movement by a screw —40— which has its inner end seated in an annular groove —41— in the shaft —12—.

The sliding clutch member —26— has only a slight axial movement and is normally held out of engagement with the worm gear —21— by means of a spring —42— acting upon a key —43— which engages the adjacent face of the clutch element —26— so that the cam faces —27— and —28— are normally out of engagement with each other. It is now clear that the operator, by drawing downwardly upon the handle —33—, may rock the shaft —12— and pinion —11— to feed the sleeve —9— and drill shaft —6— to positively force the drill into the work without effecting the operation of the friction clutch —26—. On the other hand when a slip or semi-automatic feed is desired the handle —30— is allowed to descend by gravity or by hand pressure and rocks the member —29—, in the direction indicated by arrow —x—, Fig. 1, thereby engaging the cam faces —28— with the cams —27— and forcing the clutch member —26— into frictional engagement with the continuously rotating worm gear —24— by which rotary motion is imparted to the shaft —12— and pinion —11— to move the drill shaft —6— downwardly.

A compression spring —44— is interposed between the arm —32— of the lever —33— and a lug —45— on the face of the loose rocking member —29— and tends to restore the rocking element —29— to its normal position to allow the clutch member —26— to be thrown out of frictional engagement with the worm gear —21— by the spring —42—, particularly when the lever —33— is operated to elevate the drill spindle.

When the drill spindle is fed positively by the hand lever —33— the clutch member —26— rotates with it and therefore the lever —30— may follow the movement of the lever —33— without throwing the clutch member —26— into frictional engagement with the worm gear —24—, but when it is desired to feed the drill spindle downwardly automatically the lever —30— is rocked by hand toward the lever —33— sufficient to cause the cam faces —27— and —28— to engage and throw the clutch member —26— into frictional engagement with the worm gear —24—, it being apparent that only a very light pressure upon the lever —30— is required to effect this frictional engagement and that the labor is, therefore, reduced to a minimum and at the same time, if the drill should encounter any obstructions, such as blow-holes, or was feeding faster than it could cut, the friction faces —24— and —25— would simply slip one upon the other until the drill had sufficiently recovered itself to progress into the work. This friction feed, is therefore, of great importance owing to the fact that it is self-acting and requires but little pressure as the weight of the handle —30— to feed the drill downwardly into the work and at the same time the liability of breaking or unduly dulling the drill is reduced to a minimum. In restoring the drill spindle —6— to its normal up-right position it is simply necessary for the operator to lift the lever —33—, which not only elevates the spindle but also throws the friction clutch —26— out of action.

In Fig. 6 I have shown a modified means of controlling the feed consisting of clutch members —26'— and —29'— corresponding to the parts —26— and —29— except that the member —29— is unprovided with a hand lever, but is provided with a pair of axially projecting studs —50— and —51— to which are pivoted links —52— and —53— having their upper ends connected respectively to hand levers —54— and —55—. These levers —54— and —55— are fulcrumed upon a head —56— which in turn is secured to a hand lever —57— having its lower end secured to a collar —31'— which is keyed or otherwise secured to a shaft —12'— similar to the shaft —12—, otherwise the parts are the same as those seen in Figs. 1 to 5 inclusive.

In the construction shown in Figs. 6 and 7 the shaft —12'— is rotated positively by the lever —57— to feed the drill spindle —6— downwardly and upwardly, but when the friction feed is desired the lever —54— is moved in the direction indicated by the arrow —y—, Fig. 6, which rocks the cam member —29'—, thereby engaging its cam faces —28'— with the corresponding cam faces —27'— of the clutch member —26'— and forcing said clutch member into frictional engagement with the worm gear as —21—, so that rotary motion is imparted from said worm gear to the shaft —12'— and pinion —11— for feeding the drill shaft —6— downwardly. The clutch member —26'— is released from frictional engagement with the worm gear —21— by rocking the lever —55— toward the handle —56—, as shown in Fig. 6, by which movement the cam —29'— is rocked to its normal position, thus stopping the friction feed, whereupon, the drill spindle —6— may be elevated out of the work by means of the handle —57—.

What we claim is,—

1. In a drilling machine, a rotary axially movable drill spindle, a shaft and pinion for moving the said spindle axially, a slip feed for rotating the shaft, a hand-piece for controlling the slip feed mechanism, a second hand-piece and connections for rotating the shaft independently of the slip feed mechanism, and connections between said hand-pieces whereby the return of the second hand-piece automatically throws the slip feed mechanism out of action.

2. In combination with a rotary axially movable drill spindle and means for rotating said spindle, a rack and pinion for moving the spindle axially, a rotary shaft to which the pinion is secured, a clutch composed of two members, one being loose on the shaft and the other keyed to it and slidable endwise thereon into and out of frictional engagement with the loose clutch element, means to rotate the loose element, a rocking member loose on the shaft and provided with means for forcing the keyed clutch element into engagement with the loose clutch element for rotating the shaft under a slip feed, a second rocking member keyed to the shaft and provided with a handle whereby the shaft may be rocked independently of the slip feed, and connections between said rocking members whereby the movement of one rocking member in one direction operates the other rocking member in the same direction.

3. In combination with a rotary axially movable drill spindle and means to rotate the same, a rack and pinion for moving the spindle axially, a shaft secured to the pinion, a worm gear and rocking member both loose on the shaft, a worm to rotate the gear, a slip feed connection between the rocking member and the gear whereby rotary motion is imparted from said gear to the shaft for moving the spindle axially, separate means operated by hand for rotating the shaft independently of the first named rocking means, and connections between the rocking members whereby when the last named rocking member is operated to elevate the drill spindle the first named rocking member is operated to throw the slip feed connection between the gear and shaft out of action.

4. The combination with a drill spindle, a rack and pinion for moving said spindle axially, a driving shaft for the pinion, a worm gear loose on the shaft, a driving worm for the worm gear, a clutch member feathered on the shaft and movable into frictional engagement with the gear to transmit rotary motion to the shaft, hand operated means for moving said clutch member axially and additional hand operated means for rotating the shaft independently of the said friction clutch, and means brought into action by the return of the last named means for throwing the clutch out of action.

In witness whereof we have hereunto set our hands on this 9th day of November, 1905.

GEORGE A. SEIB.
IRVING A. WESTON.

Witnesses:
H. E. CHASE,
J. M. HAMMEKEN.